US011865850B2

(12) United States Patent
Tomimatsu et al.

(10) Patent No.: US 11,865,850 B2
(45) Date of Patent: Jan. 9, 2024

(54) LIQUID EJECTING APPARATUS AND LIQUID EJECTING HEAD

(71) Applicant: Seiko Epson Corporation, Tokyo (JP)

(72) Inventors: Shingo Tomimatsu, Shiojiri (JP); Masahiko Sato, Azumino (JP); Hiroki Kobayashi, Matsumoto (JP); Osamu Yagi, Kyotanabe (JP); Kenta Ono, Shiojiri (JP)

(73) Assignee: SEIKO EPSON CORPORATION (JP)

(*) Notice: Subject to any disclaimer, the term of this patent is extended or adjusted under 35 U.S.C. 154(b) by 25 days.

(21) Appl. No.: 17/681,947

(22) Filed: Feb. 28, 2022

(65) Prior Publication Data

US 2022/0305827 A1 Sep. 29, 2022

(30) Foreign Application Priority Data

Mar. 1, 2021 (JP) ................................ 2021-031443

(51) Int. Cl.
*B41J 25/34* (2006.01)
*B41J 2/14* (2006.01)

(52) U.S. Cl.
CPC ........... *B41J 25/34* (2013.01); *B41J 2/14201* (2013.01)

(58) Field of Classification Search
CPC .................... B41J 25/34; B41J 2/14201; B41J 2002/14241; B41J 2002/14362; B41J 2002/14419; B41J 2202/08; B41J 2/14233; B41J 2202/19; B41J 2202/20; B41J 2/14088; B41J 2202/16
See application file for complete search history.

(56) References Cited

U.S. PATENT DOCUMENTS

2011/0316935 A1* 12/2011 Sato .................... B41J 2/14274 347/63
2019/0143687 A1 5/2019 Zhang

FOREIGN PATENT DOCUMENTS

JP 2010-214743 A 9/2010
JP 2019-089310 A 6/2019

OTHER PUBLICATIONS

Hine et al., Single Pass Ink Jet Printer Has Printhead With Arrays Of Orifices And Ink Jet Modules Extending Transverse To Web Motion Direction, May 14, 1998, p. 8 lines 12-21 (Year: 1998).*

* cited by examiner

*Primary Examiner* — Lisa Solomon
(74) *Attorney, Agent, or Firm* — Harness, Dickey & Pierce, P.L.C.

(57) ABSTRACT

A liquid ejecting apparatus includes a liquid ejecting head including head chips each including a nozzle plate, a holder that is formed of resin, holds the head chips, and includes a flow path for supplying the liquid to each of the head chips, a holder cover that is formed of a material having a higher thermal conductivity than a thermal conductivity of the holder and houses the head chips and the holder, and a fixing plate that is formed of metal and to which the holder cover and the head chips are fixed, a carriage on which the liquid ejecting head is mounted, and a heater that is mounted on the carriage and heats the liquid inside each of the head chips via the holder cover and the fixing plate.

14 Claims, 12 Drawing Sheets

LIQUID EJECTING APPARATUS AND LIQUID EJECTING HEAD

The present application is based on, and claims priority from JP Application Serial Number 2021-031443, filed Mar. 1, 2021, the disclosure of which is hereby incorporated by reference herein in its entirety.

BACKGROUND

1. Technical Field

The present disclosure relates to a liquid ejecting apparatus and a liquid ejecting head.

2. Related Art

In a related art, there is a known liquid ejecting apparatus, typically ink jet printer, including a liquid ejecting head that ejects a liquid such as ink. For example, JP-A-2019-89310 discloses a liquid ejecting apparatus including a holder that holds a plurality of head chips and forms a flow path to supply a liquid to the plurality of head chips. The holder included in the liquid ejecting apparatus is formed of resin. JP-A-2010-214743 discloses a liquid ejecting head including a heater that heats a liquid inside each of a plurality of head chips.

In the liquid ejecting apparatus described in JP-A-2019-89310 above, the liquid inside each of the plurality of head chips may be heated as described in JP-A-2010-214743. In the liquid ejecting apparatus described in JP-A-2019-89310, however, as the plurality of head chips is held by a holder formed of a resin generally having a low thermal conductivity, it is difficult to heat, from outside the liquid ejecting head, the liquid inside each of the plurality of head chips.

SUMMARY

According to an aspect of the present disclosure, a liquid ejecting apparatus includes a liquid ejecting head including a plurality of head chips each including a nozzle plate including a nozzle ejecting a liquid, a holder that is formed of resin, holds the plurality of head chips, and includes a flow path for supplying the liquid to each of the plurality of head chips, a holder cover that is formed of a material having a higher thermal conductivity than a thermal conductivity of the holder and houses the plurality of head chips and the holder, and a fixing plate that is formed of metal and to which the holder cover and the plurality of head chips are fixed, a carriage on which the liquid ejecting head is mounted, and a heater that is mounted on the carriage and heats the liquid inside each of the plurality of head chips via the holder cover and the fixing plate.

According to an aspect of the present disclosure, a liquid ejecting head mounted on a carriage on which a heater is mounted includes a plurality of head chips each including a nozzle plate including a nozzle ejecting a liquid, a holder that is formed of resin, holds the plurality of head chips, and includes a flow path for supplying the liquid to each of the plurality of head chips, a holder cover that is formed of a material having a higher thermal conductivity than a thermal conductivity of the holder and houses the plurality of head chips and the holder, and a fixing plate that is formed of metal and to which the holder cover and the plurality of head chips are fixed. The heater heats the liquid inside each of the plurality of head chips via the holder cover and the fixing plate.

DESCRIPTION OF EXEMPLARY EMBODIMENTS

An embodiment of the present disclosure will be described below with reference to the accompanying drawings. In each drawing, the dimension and scale of each unit are different from the actual ones as appropriate. The embodiment described below is a suitable specific example of the present disclosure, and therefore various technically preferable limitations are given; however, the scope of the present disclosure is not limited to the embodiment unless there is a description below to particularly limit the present disclosure.

1. First Embodiment

Figure 1:
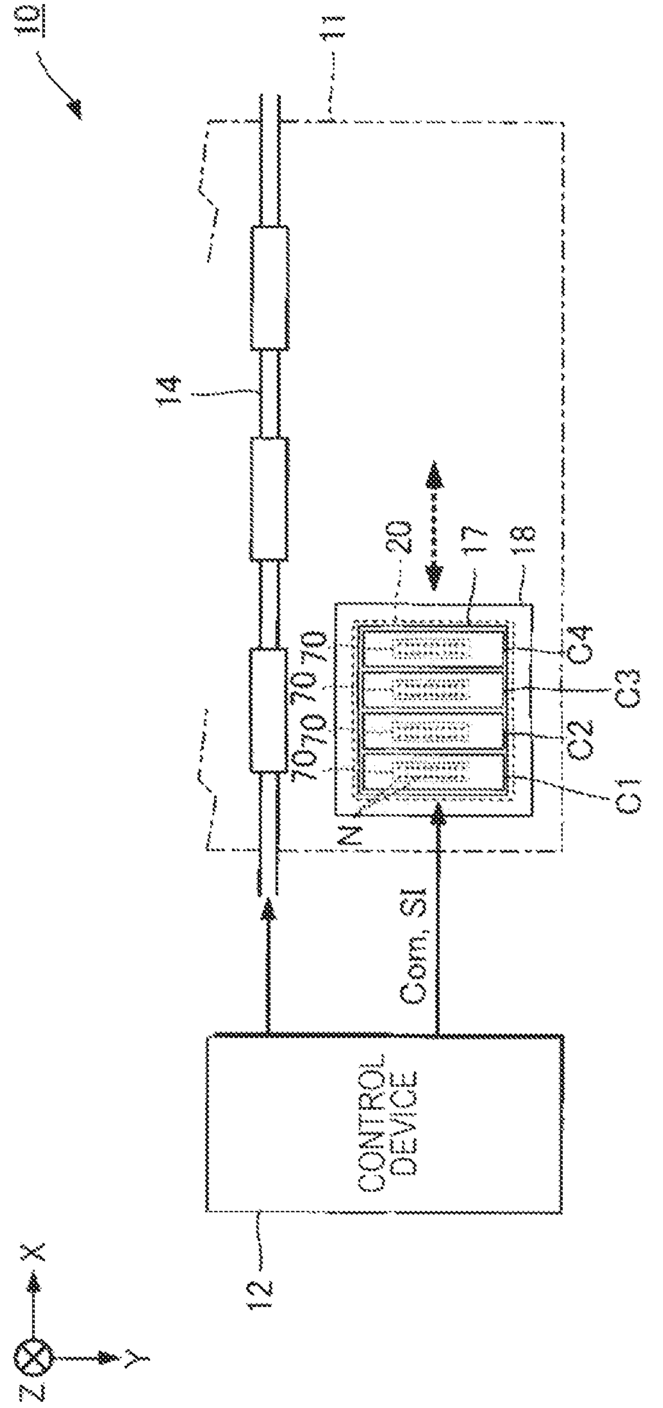
FIG. 1 is a partial configuration diagram of a liquid ejecting apparatus according to a first embodiment of the present disclosure.

FIG. 1 is a partial configuration diagram of a liquid ejecting apparatus 10 according to a first embodiment of the present disclosure. The liquid ejecting apparatus 10 according to the first embodiment is an ink jet printing apparatus that ejects an ink, which is an example of a liquid, onto a medium 11 such as print sheet. The liquid ejecting apparatus 10 illustrated in FIG. 1 includes a control device 12, a transport mechanism 14, a carriage 18, and a liquid ejecting head 20. The control device 12 collectively controls respective elements of the liquid ejecting apparatus 10.

The transport mechanism 14 transports the medium 11 in a +Y direction, which is a sub-scanning direction, under the control of the control device 12. The carriage 18 reciprocates in a +X direction and a −X direction, which are a main scanning direction, under the control of the control device 12. The liquid ejecting head 20 ejects the ink onto the medium 11 in parallel with the transport of the medium 11 and the reciprocation of the carriage 18, and a desired image is thus formed on a surface of the medium 11. An ejection direction of the ink by the liquid ejecting head 20 is referred to as "+Z direction". Hereinafter, the +X direction and the −X direction are collectively referred to as "X-axis direction", the +Y direction and a −Y direction opposite from the +Y direction are collectively referred to as "Y-axis direction", and the +Z direction and a −Z direction opposite from the +Z direction are collectively referred to as "Z-axis direction".

The liquid ejecting head 20 is mounted on a surface of the carriage 18 in the −Z direction. In the −Z direction of the liquid ejecting head 20, a liquid storage section 17 is provided, which houses a plurality of liquid containers C1 to C4 that separately stores a plurality of types of inks. The inks according to the present embodiment are, for example, UV inks. UV is an abbreviation for ultra violet. The UV inks have the property of high viscosity at low temperatures and low viscosity at high temperatures. In order to improve ejecting performance, the UV inks need to be used in a high-temperature state. The inks according to the present embodiment are not limited to the UV inks and may be water-based inks or organic solvent based inks used for typical printing applications. The inks are, for example, liquids in a total of four colors, e.g., cyan, magenta, yellow, and black. The liquid containers C1 to C4 according to the present embodiment contain cyan, magenta, yellow, and black inks, respectively. The configuration and the number of the liquid containers C1 to C4 are not limited to those illustrated.

The liquid ejecting head 20 includes a plurality of head chips 70. Each of the head chips 70 is a flow path structure including a member in which a flow path is formed. In the example described according to the present embodiment, the four head chips 70 are arranged in the X-axis direction. Two nozzle rows are provided in each of the head chips 70. Each of the plurality of head chips 70 extends in the Y-axis direction, and each of the nozzle rows is a set of nozzles N that are linearly arranged in the Y-axis direction. The numbers and the arrangements of the head chips 70 and the nozzle rows are not limited to those illustrated. The liquid ejecting head 20 includes a flow path through which the ink flows and a filter that filters the ink flowing through the flow path.

As illustrated in FIG. 1, a drive signal Com for driving the liquid ejecting head 20 and a control signal S1 for controlling the liquid ejecting head 20 are supplied from the control device 12 to the liquid ejecting head 20. The liquid ejecting head 20 is driven by the drive signal Com under the control by the control signal S1, and all or some of the plurality of nozzles N included in the liquid ejecting head 20 eject the ink in the +Z direction.

1.1. Structure of Liquid Ejecting Head 20

A structure of the liquid ejecting head 20 will be described with reference to FIGS. 2 to 7.

Figure 2:
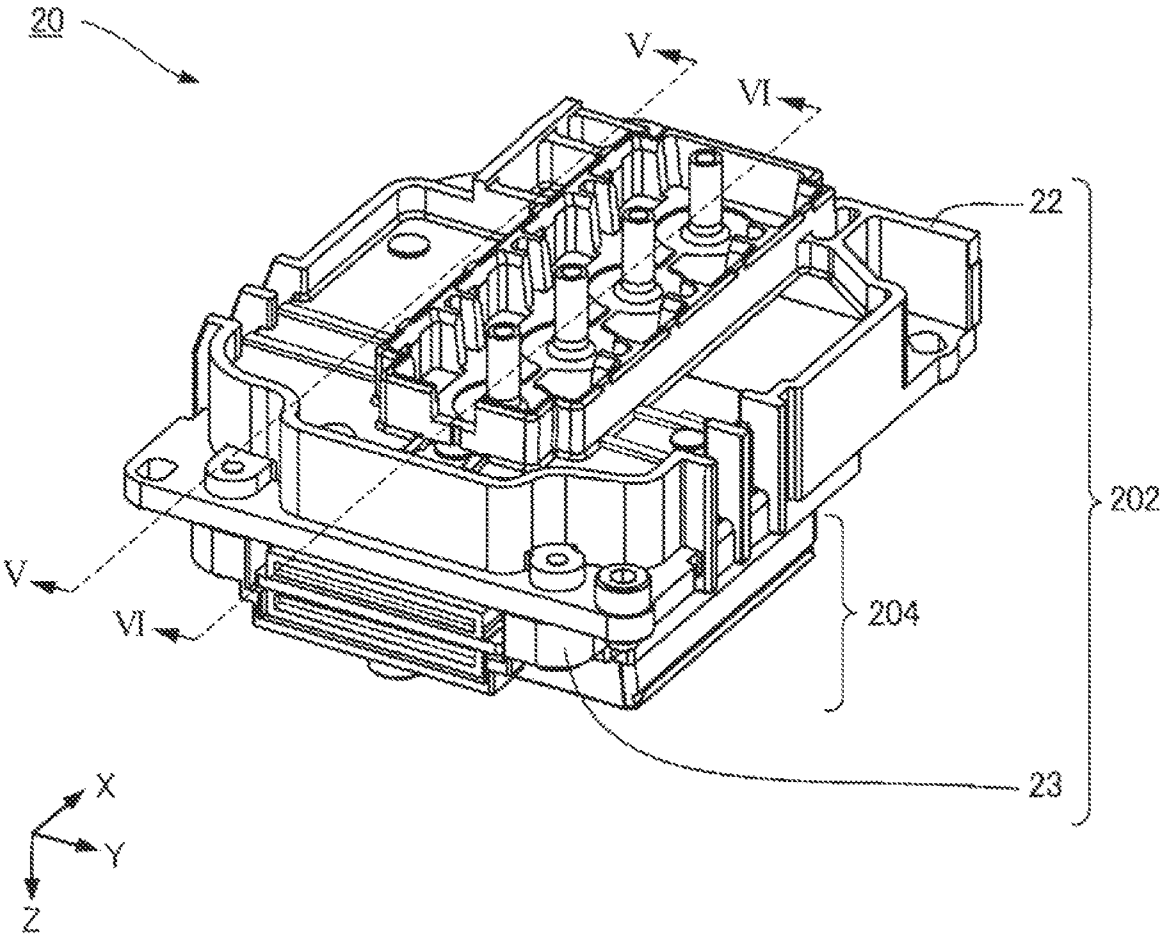
FIG. 2 is an external perspective view of a liquid ejecting head.
Figure 3:
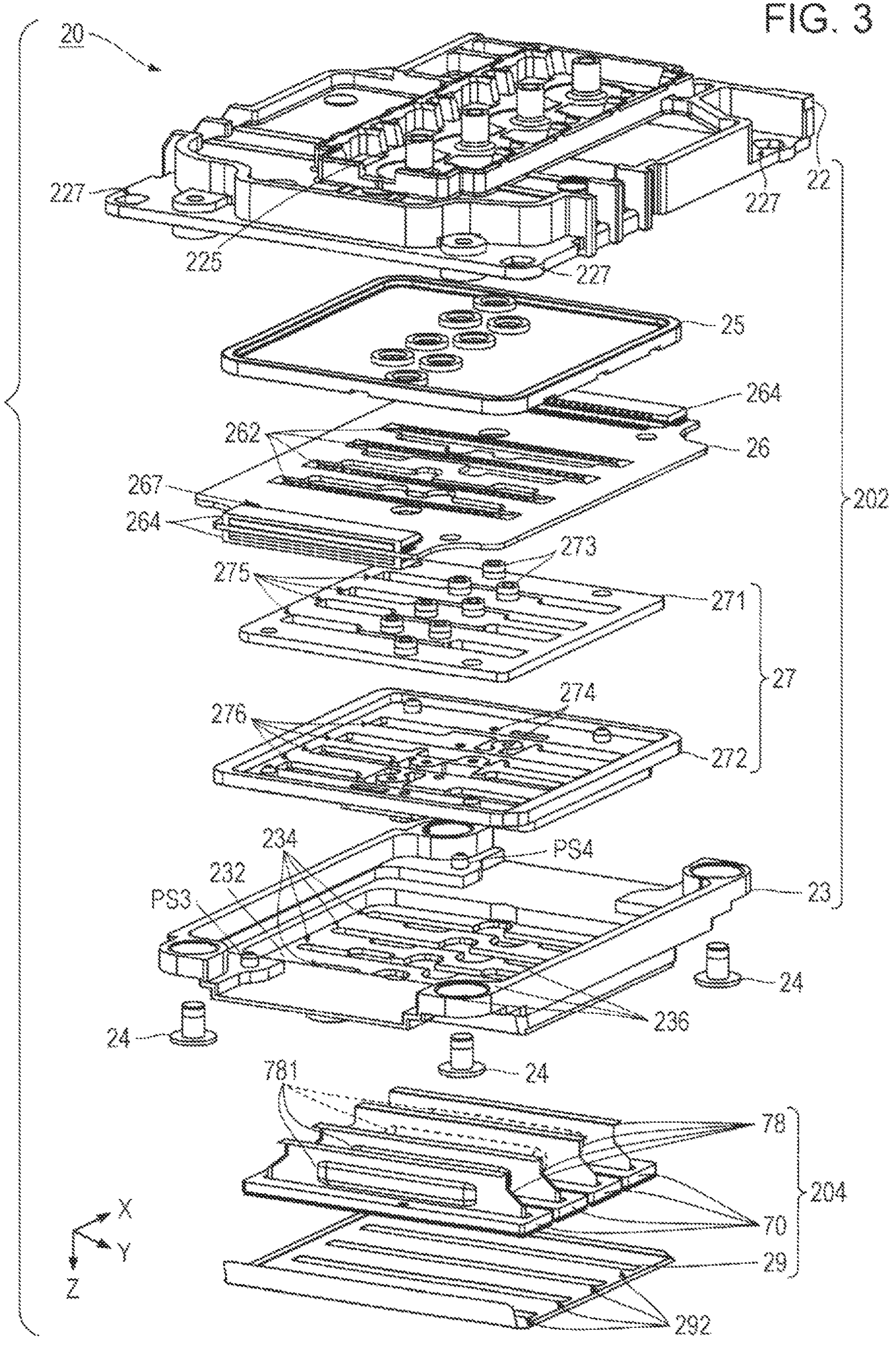
FIG. 3 is an exploded perspective view of the liquid ejecting head.
Figure 4:
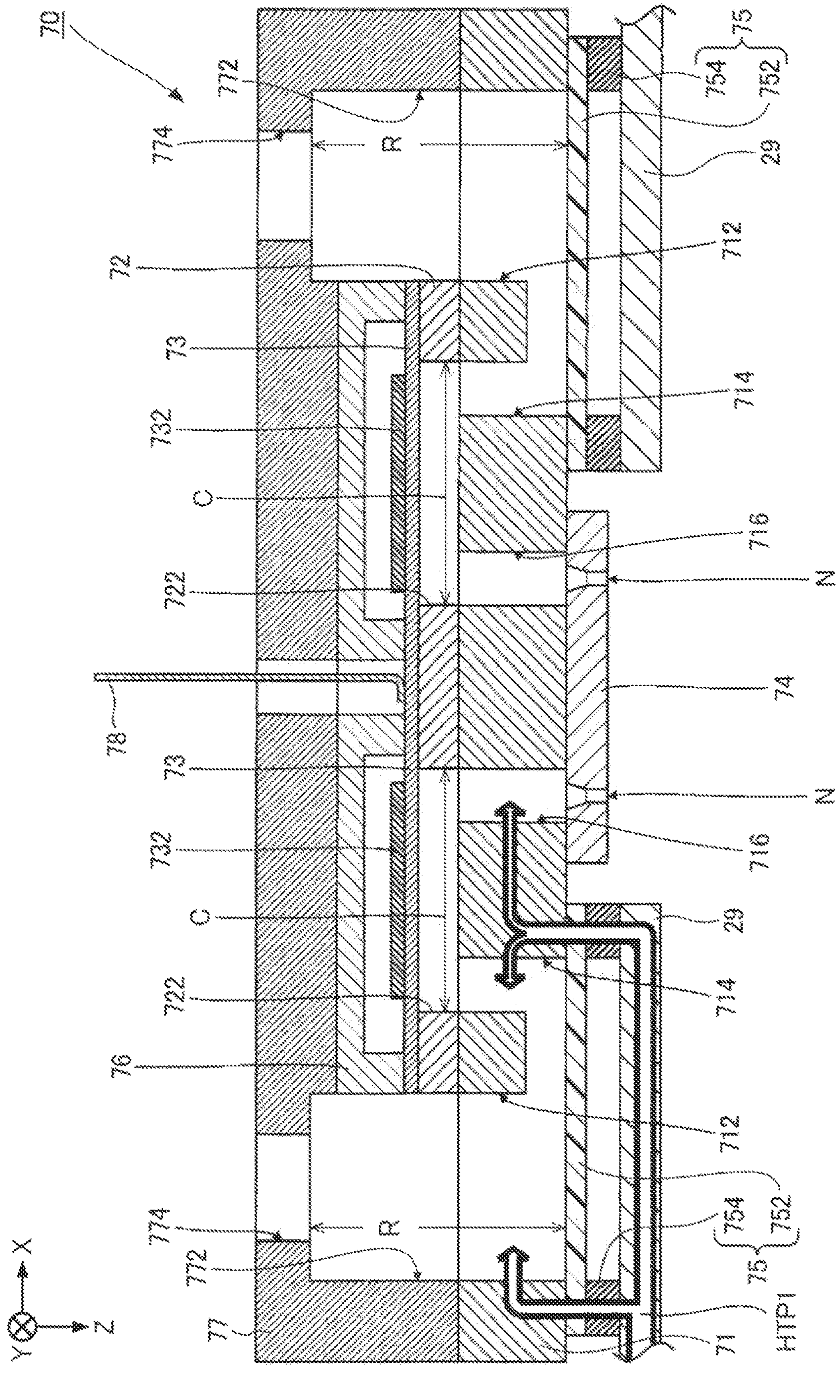
FIG. 4 is a sectional view of a head chip.
Figure 5:
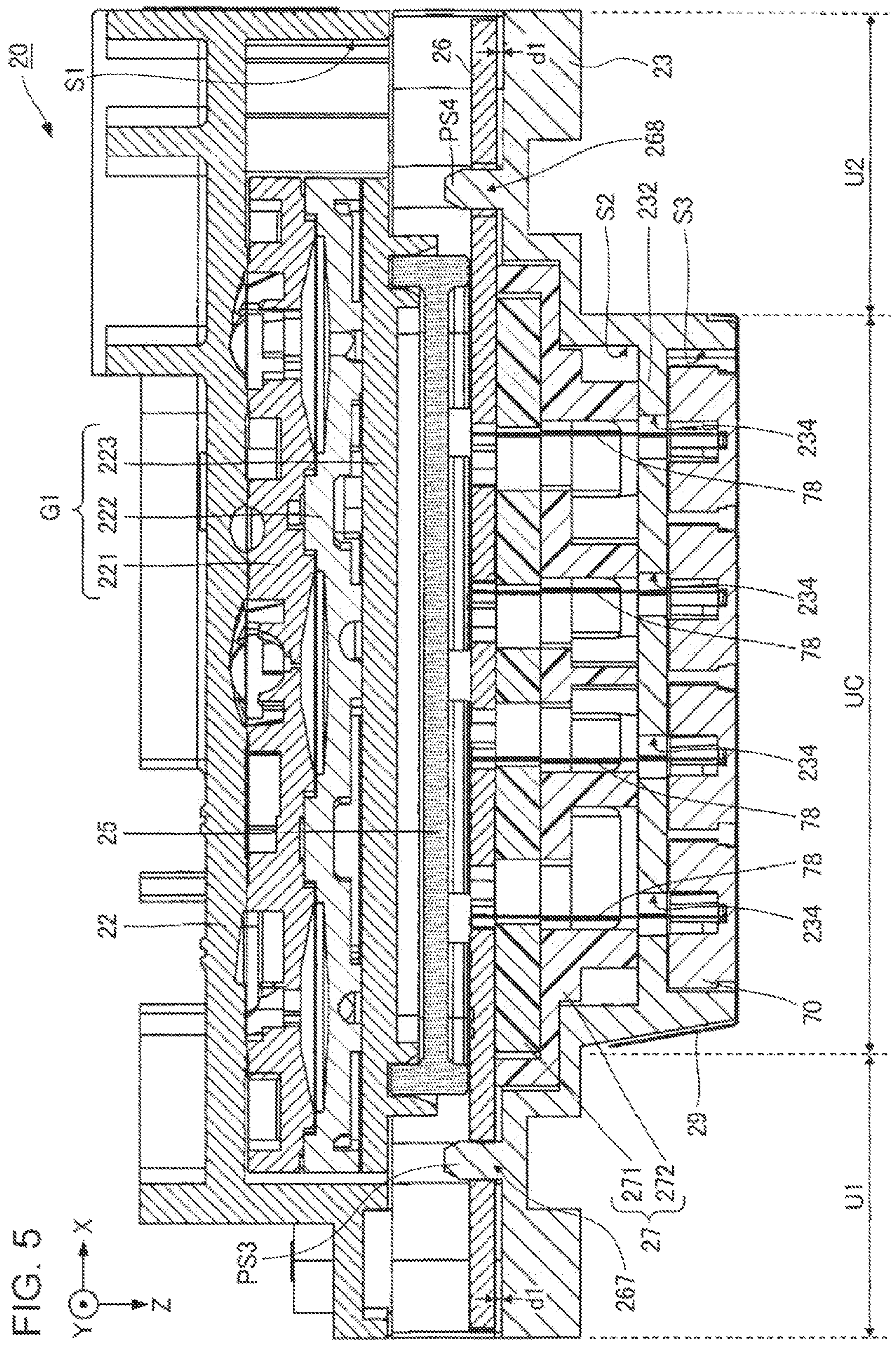
FIG. 5 is a V-V sectional view of the liquid ejecting head illustrated in FIG. 2.
Figure 6:
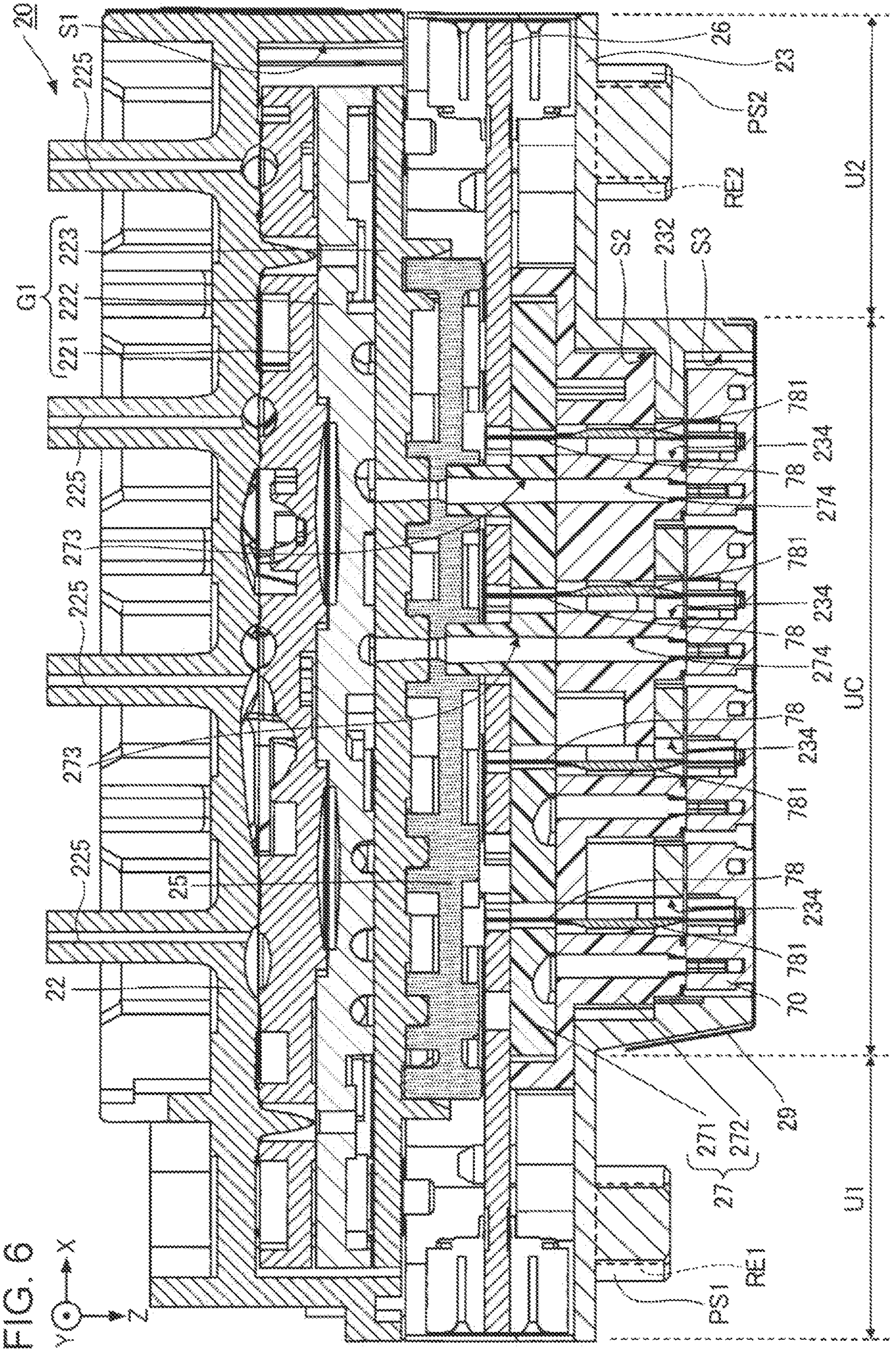
FIG. 6 is a VI-VI sectional view of the liquid ejecting head illustrated in FIG. 2.
Figure 7:
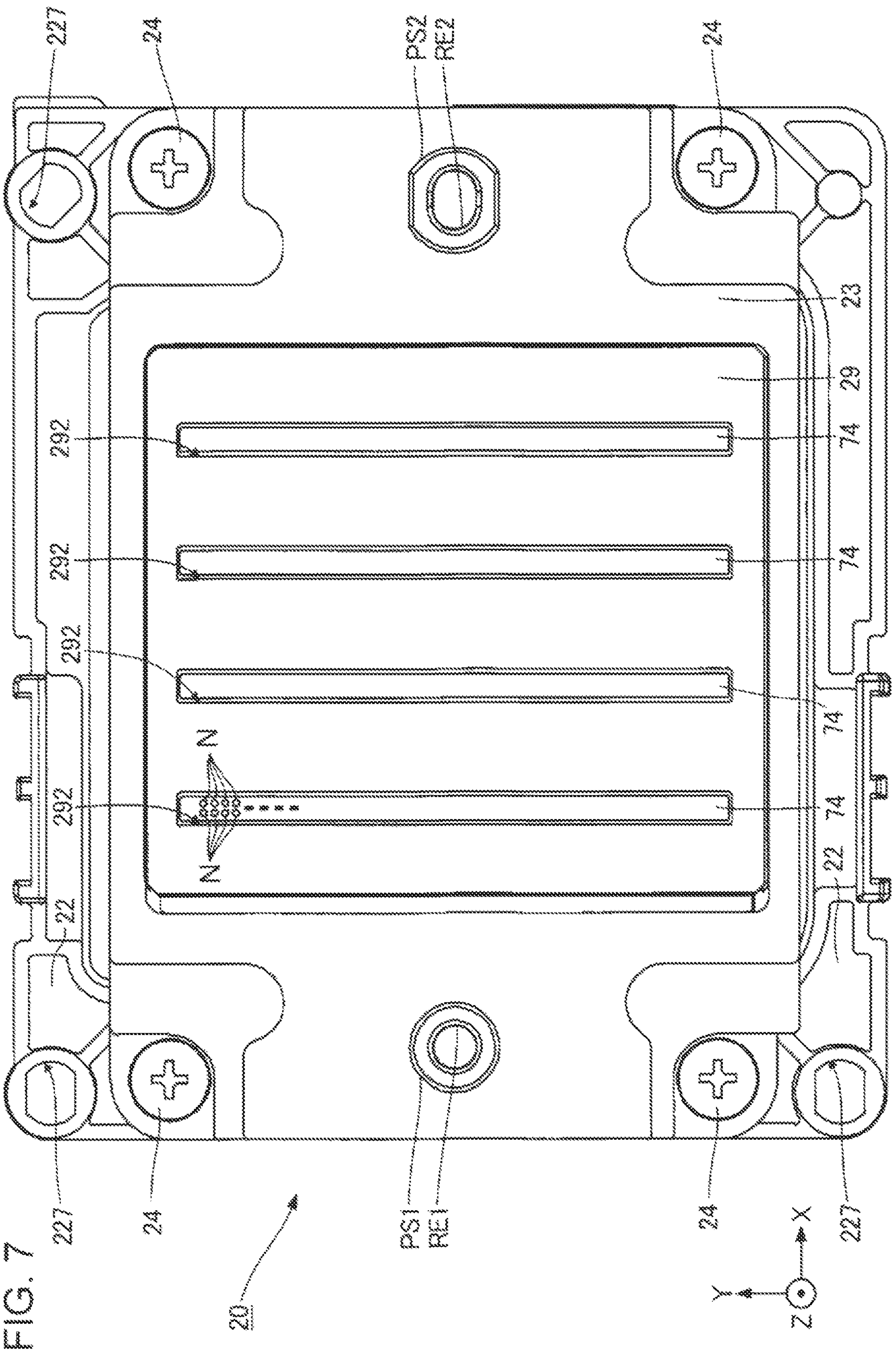
FIG. 7 is a bottom view of the liquid ejecting head.

FIG. 2 is an external perspective view of the liquid ejecting head 20. FIG. 3 is an exploded perspective view of the liquid ejecting head 20. FIG. 4 is a sectional view of any of the head chips 70. FIG. 4 illustrates a fixing plate 29 in addition to the head chip 70. FIG. 5 is a V-V sectional view of the liquid ejecting head 20 illustrated in FIG. 2. FIG. 6 is a VI-VI sectional view of the liquid ejecting head 20 illustrated in FIG. 2. The V-V section and the VI-VI section are sections parallel to an XZ plane. In order to avoid complication of the drawing, the inside of the head chip 70 is not illustrated in FIGS. 5 and 6. FIG. 7 is a bottom view of the liquid ejecting head 20.

As illustrated in FIGS. 2 and 3, the liquid ejecting head 20 according to the present embodiment includes a flow path unit 202 and a head main body 204. The head main body 204 houses the four head chips 70 described above. The flow path unit 202 supplies cyan, magenta, yellow, and black, which are the inks from the liquid containers C1 to C4, to the respective head chips 70 of the head main body 204.

As illustrated in FIG. 4, the head chip 70 includes a flow path formation substrate 71, a pressure chamber formation substrate 72 stacked on a surface of the flow path formation substrate 71 in the −Z direction, a vibration plate 73 stacked on the pressure chamber formation substrate 72 in the −Z direction, and a nozzle plate 74 and a compliance portion 75 provided on a surface of the flow path formation substrate 71 in the +Z direction. The nozzles N are formed in the nozzle plate 74. The structure corresponding to each row of the nozzles N is formed substantially in line symmetry in each of the head chips 70, and therefore the structure of the head chip 70 will be described below with a focus on one row of the nozzles N for convenience.

The flow path formation substrate 71 is a plate-shaped member forming a flow path of the ink. In the flow path formation substrate 71 according to the present embodiment, an opening 712, a supply flow path 714, and a communication flow path 716 are formed. The supply flow path 714 and the communication flow path 716 are formed for each of the nozzles N, and the opening 712 continues over the plurality of nozzles N. The pressure chamber formation substrate 72 is a plate-shaped member including a plurality of openings 722 corresponding to the different nozzles N. The flow path formation substrate 71 and the pressure chamber formation substrate 72 are formed of, for example, a single-crystal substrate of silicon.

The compliance portion 75 is a mechanism that suppresses pressure fluctuations in the flow path of the head chip 70 and includes a sealing plate 752 and a support body 754. The sealing plate 752 is a film-shaped resin member having flexibility. The support body 754 fixes the sealing plate 752 to the flow path formation substrate 71 to close the opening 712 and each of the supply flow paths 714 of the flow path formation substrate 71. The support body 754 is formed of metal such as stainless steel.

The vibration plate 73 is a plate-shaped member capable of elastically vibrating and is formed by stacking an elastic film formed of an elastic material such as silicon oxide and an insulating film formed of an insulating material such as zirconium oxide. The vibration plate 73 and the flow path formation substrate 71 face each other with a gap interposed therebetween inside each of the openings 722 formed in the pressure chamber formation substrate 72. The space between the flow path formation substrate 71 and the vibration plate 73 inside each of the openings 722 functions as a pressure chamber C that applies pressure to the ink. According to the present embodiment, two rows of the pressure chambers C arranged in the Y-axis direction are arranged in the X-axis direction.

As illustrated in FIG. 4, a support body 77 is fixed to the flow path formation substrate 71 and a protective plate 76. The support body 77 is integrally formed by molding a resin material, for example. The support body 77 according to the present embodiment is a member including a space 772 forming, together with the opening 712 of the flow path formation substrate 71, a liquid storage chamber R, and a supply port 774 communicating with the liquid storage chamber R. The liquid storage chamber R stores the ink introduced through the supply port 774. The ink stored in the liquid storage chamber R is distributed by the plurality of supply flow paths 714, fills each of the pressure chambers C, is passed through the communication flow path 716 and the nozzle N from each of the pressure chambers C, and is ejected in the +Z direction.

An end portion of a wiring member 78 is joined to the vibration plate 73. The wiring member 78 is a wiring substrate on which wires are formed to transmit the drive signal Com and a power supply voltage to each piezoelectric element 732. Each of the four head chips 70 has a corresponding wiring member 78 coupled thereto. A flexible wiring substrate such as FPC, COF, or FFC is suitably used as the wiring member 78. Here, FPC is an abbreviation for flexible printed circuit. COF is an abbreviation for chip on film. FFC is an abbreviation for flexible flat cable.

As illustrated in FIGS. 3 and 6, the wiring member 78 includes a drive circuit 781. The drive circuit 781 is provided on the surface of the wiring member 78 in the −X direction in the two head chips 70 out of the four head chips 70 illustrated in FIG. 3, and the drive circuit 781 is provided on the surface of the wiring member 78 in the +X direction in the remaining two head chips 70. In FIG. 3, the drive circuit 781 provided on the surface of the wiring member 78 in the +X direction is indicated by a broken line. The drive circuit 781 is an electric circuit that performs, based on the control signal S1, switching whether to supply the drive signal Com to the piezoelectric element 732. Each of the wiring members 78 is coupled to a circuit substrate 26 described below.

As illustrated in FIGS. 2 and 3, the flow path unit 202 is formed by housing each component in a member including a case 22 and a holder cover 23. The case 22 is formed by injection molding of a resin material, for example, and is stacked on the holder cover 23. As illustrated in FIGS. 3 and 7, the case 22 and the holder cover 23 are fixed to each other by a plurality of screws 24. As illustrated in FIGS. 3 and 7, the case 22 includes a plurality of through-holes 227 extending in the Z-axis direction. The plurality of through-holes 227 are used to fix the liquid ejecting head 20 to the carriage 18.

As illustrated in FIGS. 5 and 6, a space S1 is formed in the +Z direction of the case 22. The holder cover 23 includes an inner bottom surface 232 substantially parallel to the XY plane. The inner bottom surface 232 includes four openings 234 through which the respective four wiring members 78 are inserted. The four openings 234 are provided to extend in the Y-axis direction. Due to the four openings 234 extending in the Y-axis direction, the inner bottom surface 232 includes three beam portions 236 extending in the Y-axis direction. A space S2 is formed in the −Z direction with respect to the inner bottom surface 232, and a space S3 is formed in the +Z direction with respect to the inner bottom surface 232.

The +Y direction and the −Y direction are examples of a "second direction".

As illustrated in FIGS. 5 and 6, the space S2 of the holder cover 23 houses a sealing member 25, the circuit substrate 26, and a holder 27. As illustrated in FIG. 5, the circuit substrate 26 is stacked on the holder 27 with a gap dl interposed between the circuit substrate 26 and the holder cover 23 in the Z-axis direction.

The Z-axis direction, that is, the +Z direction and the −Z direction, are examples of "stacking direction".

The holder 27 includes a first holder 271 and a second holder 272. In the space S2, the first holder 271 and the second holder 272 are sequentially stacked from the −Z direction. The space S3 of the holder cover 23 houses the plurality of head chips 70, and the holder cover 23 is closed by the fixing plate 29 from the +Z direction. The space S1 of the case 22 houses a filter unit G1. The filter unit G1 is stacked at the sealing member 25 in the −Z direction on the side opposite from the circuit substrate 26.

As illustrated in FIGS. 5 and 6, the filter unit G1 is a flow path structure including a plurality of stacked constituent members 221, 222, and 223. The constituent members 221, 222, and 223 are members in which an ink flow path is formed. The flow paths formed in the constituent members 221, 222, and 223 are not illustrated. The above-described filter is provided in the middle of the flow path in the constituent member 222. As FIG. 3 illustrates a state where the filter unit G1 is fixed to the surface of the case 22 in the +Z direction, the filter unit G1 is not illustrated. Instead of the filter unit G1, it is possible to provide a flow path component in which a flow path without a filter is formed. The filter unit G1 is formed by injection molding of a resin material. The filter unit G1 is formed of, for example, a thermoplastic resin or a thermosetting resin. Examples of the thermoplastic resin include Zylon, LCP, PPS, and PP. Zylon is a registered trademark. LCP is a liquid crystal polymer. PPS is polyphenylene sulfide. PP is polypropylene. Examples of the thermosetting resin include an epoxy resin and a phenol resin.

The circuit substrate 26 is a substrate that relays the drive signal Com, the control signal S1, and the like, supplied from the control device 12. The circuit substrate 26 includes terminal portions 262 that are electrically coupled to the wiring members 78 of the respective head chips 70. The circuit substrate 26 has a connector 264 for coupling with the control device 12 and has other electronic components mounted thereon. The terminal portions 262 and the connector 264 are electrically coupling portions. On the circuit substrate 26 according to the present embodiment, the four terminal portions 262 corresponding to the wiring members 78 of the four head chips 70 are formed in the −Z direction of the circuit substrate 26. A wiring member such as FFC is coupled to the connector 264, and the circuit substrate 26 receives the drive signal Com from the control device 12 via the FFC. FFC is an abbreviation for flexible flat cable. The connector 264 of the circuit substrate 26 according to the present embodiment is provided to be exposed from the respective end portions in the +X direction and the −X direction.

As illustrated in FIGS. 3 and 5, the circuit substrate 26 includes a through-hole 267 extending in the Z-axis direction. As illustrated in FIG. 5, the circuit substrate 26 includes a through-hole 268 extending in the Z-axis direction. The through-holes 267 and 268 are used for positioning the circuit substrate 26 with respect to the holder cover 23.

The first holder 271 and the second holder 272 are plate-shaped flow path structures in which ink flow paths are formed. The first holder 271 and the second holder 272 are formed by injection molding of a resin material. The first holder 271 and the second holder 272 are formed of, for example, a thermoplastic resin or a thermosetting resin, similarly to the filter unit G1. On the surface of the first holder 271 in the −Z direction, a plurality of flow paths 273 protruding in the −Z direction is formed. Although the first holder 271 includes the eight flow paths 273, only the two flow paths 273 out of the eight flow paths 273 are denoted by the reference numeral in FIGS. 3 and 6 to avoid complication of the drawing. Each of the plurality of flow paths 273 passes through a through-hole formed in the circuit substrate 26 and communicates with flow paths of the constituent members 221, 222, and 223 via a through-hole of the sealing member 25.

A plurality of flow paths 274 extending in the Z-axis direction is formed in the second holder 272. Although the second holder 272 includes the eight flow paths 274, only the two flow paths 274 out of the eight flow paths 274 are denoted by a reference numeral in FIGS. 3 and 6 to avoid complication of the drawing. Each of the plurality of flow paths 274 communicates with the corresponding one of the plurality of flow paths 273. The inks are introduced into the head chips 70 through the respective flow paths 273 and the respective flow paths 274.

The first holder 271 further includes four openings 275 through which the four wiring members 78 are inserted, respectively. Similarly, the second holder 272 includes four openings 276 through which the four wiring members 78 are inserted, respectively. The openings 275 and the openings 276 are holes penetrating in the Z-axis direction.

The holder cover 23 is formed of a material having a higher thermal conductivity than that of the first holder 271 and the second holder 272. Examples of the material having a higher thermal conductivity than that of a resin material include metal and a ceramic having a higher thermal conductivity than that of a resin material. Examples of the metal suitable for forming the holder cover 23 include stainless steel, aluminum, titanium, and magnesium alloy. Examples of the ceramic having a higher thermal conductivity than that of a resin material include silicon carbide, aluminum nitride, sapphire, alumina, silicon nitride, cermet, and yttria. In the following description, it is assumed that the holder cover 23 is formed of metal.

As described above, the space S3 of the holder cover 23 houses the plurality of head chips 70. The plurality of head chips 70 is arranged side by side in the space S3 along the X-axis. Each of the piezoelectric elements 732 in the respective head chips 70 vibrates in response to the drive signal Com supplied from the control device 12 via the circuit substrate 26 and the wiring member 78. Fluctuations in the pressure in the pressure chamber C due to the vibration of the piezoelectric element 732 cause the ink filling the pressure chamber C to be ejected through each of the nozzles N of the nozzle plate 74.

The fixing plate 29 is a plate-shaped member. The fixing plate 29 is formed of metal. Examples of the metal suitable for forming the fixing plate 29 include stainless steel. As illustrated in FIGS. 3 and 7, four openings 292 each having the shape corresponding to the nozzle plate 74 of each of the head chips 70 are formed in the fixing plate 29 for the respective head chips 70. Each opening 292 has a rectangular shape that is elongated in the Y direction. In a state where the nozzle plate 74 is positioned inside the opening 292, each of the head chips 70 is fixed to the surface of the fixing plate 29 in the −Z direction with, for example, an adhesive. Accordingly, each of the nozzles N of each nozzle row is arranged inside the opening 292. In order to avoid complication of the drawing, FIG. 7 illustrates only some of the nozzles N among the nozzles N included in the four head chips 70.

As illustrated in FIGS. 3 and 6, the surface of the case 22 in the −Z direction includes a plurality of pipes protruding in the −Z direction, and the plurality of pipes includes a plurality of flow paths 225, respectively, for introducing the inks from the liquid containers C1 to C4. The flow paths 225 introduce the inks in the liquid containers C1 to C4 into the respective head chips 70 via the flow paths in the constituent members 221, 222, and 223, the flow paths 273 of the first holder 271, and the flow paths 274 of the second holder 272.

The sealing member 25 illustrated in FIGS. 5 and 6 is a plate-like elastic member. The sealing member 25 includes a through-hole that couples the flow path in the filter unit G1 and the flow paths 273 of the first holder 271 in a liquid-tight manner.

1.2. Positioning of Liquid Ejecting Head 20 and Positioning of Circuit Substrate 26

Positioning of the liquid ejecting head 20 with respect to the carriage 18 and positioning of the circuit substrate 26 with respect to the holder cover 23 will be described with reference to FIGS. 5, 6, 8, and 9.

As illustrated in FIGS. 5 and 6, the holder cover 23 includes a holding portion UC, a first flange portion U1, and a second flange portion U2. The holding portion UC holds the holder 27. The first flange portion U1 is provided to extend from the holding portion UC in the −X direction. Being provided to extend from the holding portion UC in the −X direction specifically means that an end portion of the holding portion UC in the −X direction has a shape extending by a predetermined distance in the −X direction. The second flange portion U2 is provided to extend from the holding portion UC in the +X direction.

The −X direction is a direction in which the plurality of head chips 70 is arranged and is an example of a "first direction". The direction in which the plurality of head chips 70 is arranged is a direction in which any positions of the respective head chips 70 are arranged. The points at the positions of the respective head chips 70 may be, for example, the end portions of the respective head chips 70 in the −Y direction, the centers of the respective head chips 70, or the end portions of the respective head chips 70 in the +Y direction.

1.2.1. Positioning of Liquid Ejecting Head 20 with Respect to Carriage 18

As illustrated in FIGS. 6 and 7, the first flange portion U1 includes a first positioning portion PS1 for positioning the liquid ejecting head 20 with respect to the carriage 18. The second flange portion U2 includes a second positioning portion PS2 for positioning the liquid ejecting head 20 with respect to the carriage 18. Specifically, the first positioning portion PS1 and the second positioning portion PS2 are substantially columnar members protruding in the +Z direction. As illustrated in FIG. 6, the surface of the first positioning portion PS1 in the +Z direction includes a recessed portion RE1 that is recessed in the −Z direction, and the surface of the second positioning portion PS2 in the +Z direction includes a recessed portion RE2 that is recessed in the −Z direction. In the following description, the recessed portion RE1 and the recessed portion RE2 may be collectively referred to as "recessed portion RE". As the recessed portion RE does not appear in the VI-VI section, the outline of the recessed portion RE is indicated by a broken line in FIG. 6. As illustrated in FIG. 6, the second positioning portion PS2 is larger than the first positioning portion PS1 with respect to the X-axis direction, which is a direction in which the first positioning portion PS1 and the second positioning portion PS2 are arranged. Similarly, the recessed portion RE2 is larger than the recessed portion RE1 with respect to the X-axis direction.

Figure 8:
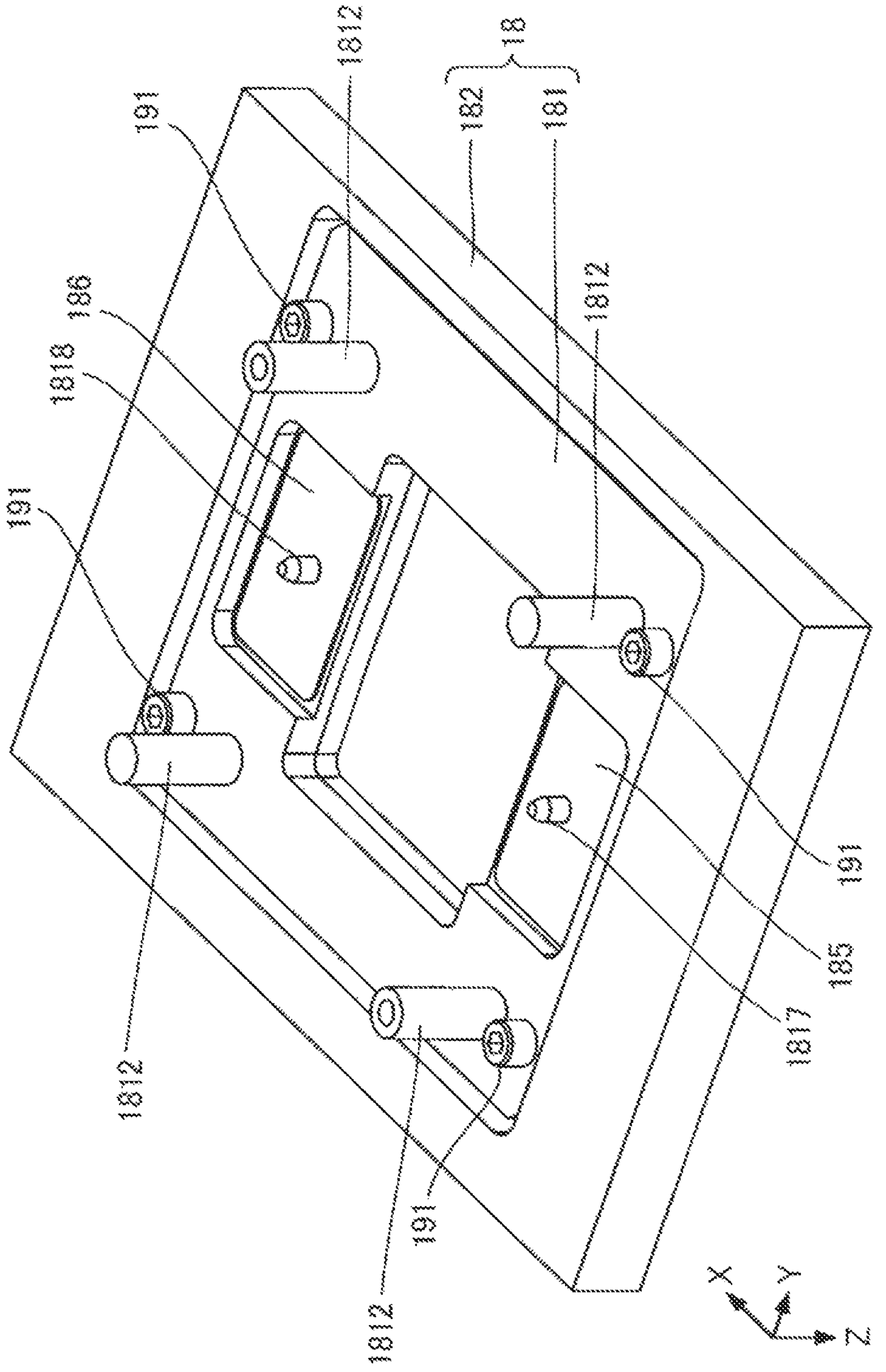
FIG. 8 is an external perspective view of a carriage.
Figure 9:
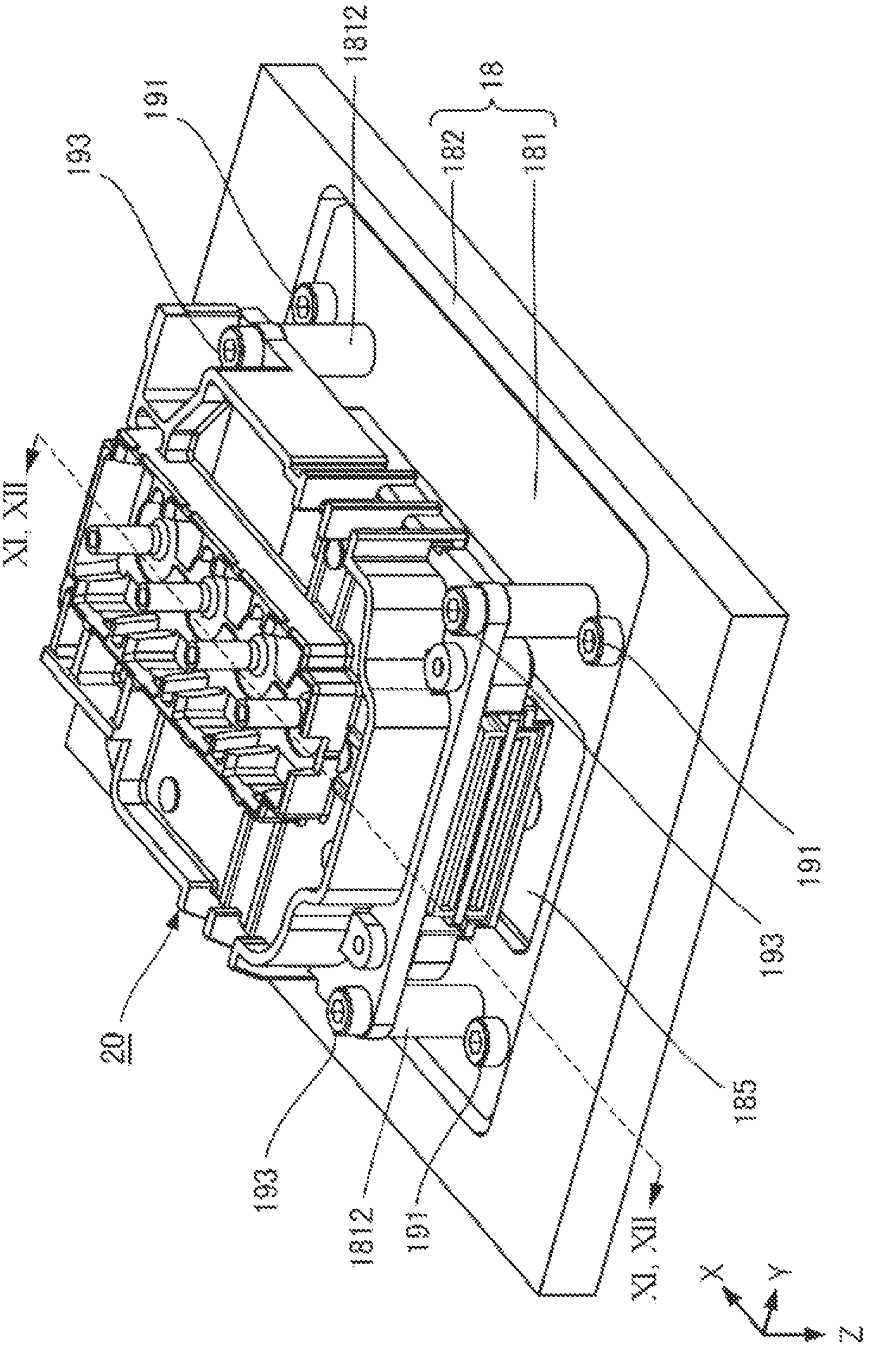
FIG. 9 is an external perspective view illustrating a state where the liquid ejecting head is attached to the carriage.
Figure 10:
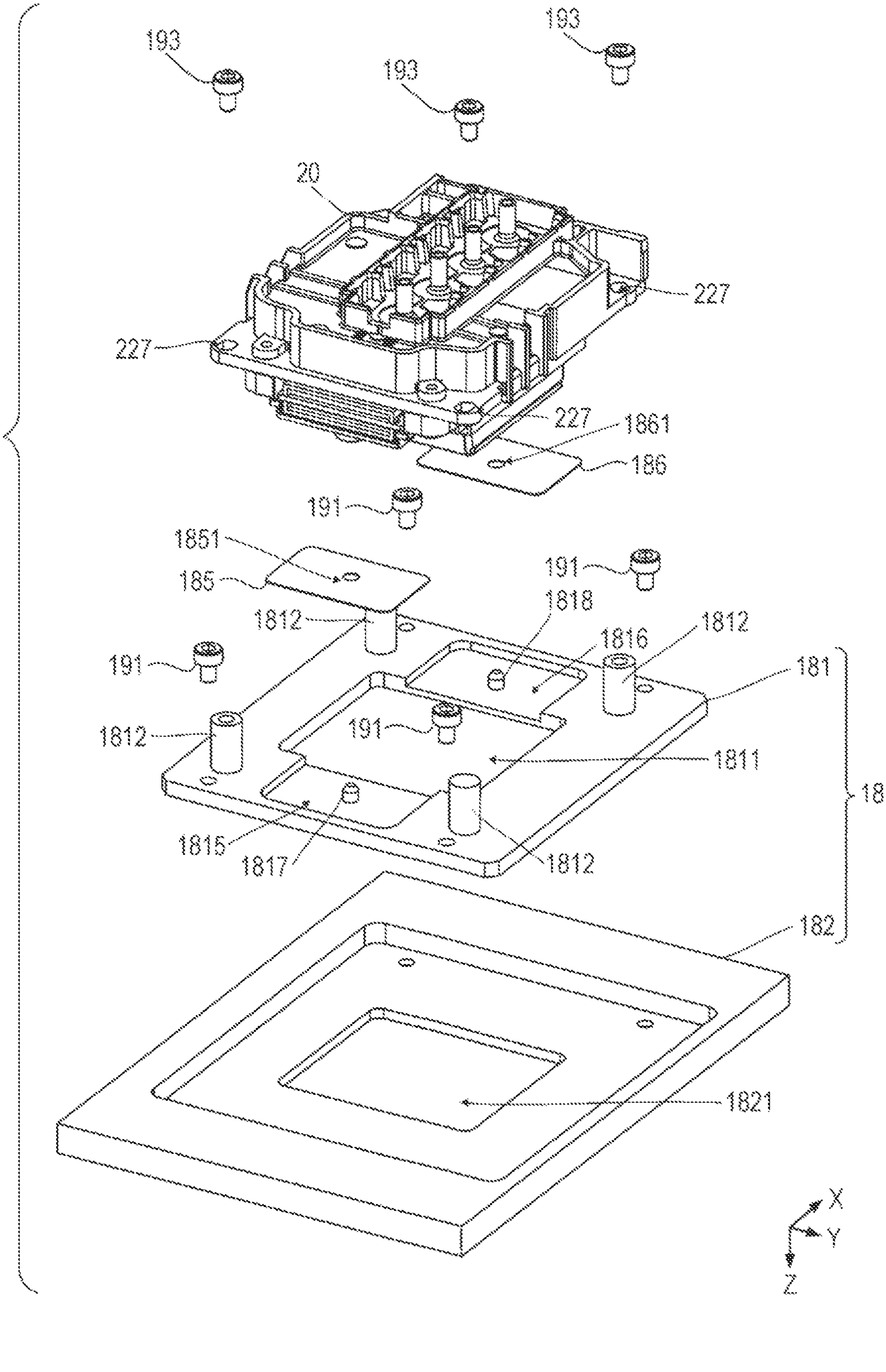
FIG. 10 is an exploded perspective view when the liquid ejecting head is attached to the carriage.

FIG. 8 is an external perspective view of the carriage 18. FIG. 9 is an external perspective view illustrating a state where the liquid ejecting head 20 is attached to the carriage 18. FIG. 10 is an exploded perspective view when the liquid ejecting head 20 is attached to the carriage 18.

As illustrated in FIGS. 8, 9, and 10, the carriage 18 includes a spacer 181 and a carriage main body portion 182. The carriage 18 has a first heater 185 and a second heater 186 mounted thereon. The spacer 181 and the carriage main body portion 182 are formed of metal. Examples of the metal suitable for forming the spacer 181 and the carriage main body portion 182 include stainless steel, aluminum, titanium, and magnesium alloy. In plan view in the +Z direction, the carriage main body portion 182 is larger than the spacer 181. Hereinafter, the plan view in the +Z direction is simply referred to as "plan view".

The first heater 185 and the second heater 186 correspond to "heater".

As illustrated in FIG. 10, the carriage main body portion 182 is a plate-shaped member substantially parallel to the XY plane and includes a through-hole 1821 extending in the Z-axis direction. In plan view, the edges of the through-hole 1821 form substantially a rectangle. The diameter of the through-hole 1821 increases toward the −Z direction. As the diameter increases, a step is formed in the through-hole 1821. The spacer 181 is fitted into the step formed in the through-hole 1821, and the carriage main body portion 182 thus holds the spacer 181. The spacer 181 and the carriage main body portion 182 are fixed to each other with a plurality of screws 191. The carriage main body portion 182 is not limited to a plate-shape and may be a recessed shape including a wall rising in the −Z direction from an outer peripheral portion of the flat plate.

As illustrated in FIGS. 8 and 10, the spacer 181 is a plate-shaped member substantially parallel to the XY plane and includes a through-hole 1811 extending in the Z-axis direction and a plurality of columnar portions 1812 protruding in the −Z direction. The through-hole 1811 has substantially a rectangular shape in plan view. The diameter of the through-hole 1811 increases toward the −X direction and the +X direction in the −Z direction. The diameter increases toward the −X direction so that a bottom portion 1815 is formed, and the diameter increases toward the +X direction so that a bottom portion 1816 is formed. The surface of the bottom portion 1815 in the −Z direction includes a protruding portion 1817 protruding in the −Z direction. The surface of the bottom portion 1816 in the −Z direction includes a protruding portion 1818 protruding in the −Z direction.

Although not illustrated, the carriage 18 may include a positioning portion that enables positioning of the spacer 181 with respect to the carriage main body portion 182. The positioning portion is formed by, for example, a plurality of adjustment screws extending in the Y-axis direction.

The first heater 185 and the second heater 186 heat, via the holder cover 23 and the fixing plate 29, the ink filling each of the plurality of head chips 70. In other words, the heat generated by the first heater 185 and the second heater 186 is transferred to the ink inside the head chip 70 via the holder cover 23 and the fixing plate 29, and thus the ink inside each of the plurality of head chips 70 is heated. According to the present embodiment, the first heater 185 and the second heater 186 are plate-shaped members substantially parallel to the XY plane. Each of the first heater 185 and the second heater 186 is not necessarily limited to a plate-shaped member. Any heater such as a film heater or a ceramic heater may be used as the first heater 185 and the second heater 186. The first heater 185 includes a through-hole 1851 extending in the Z-axis direction. As illustrated in FIG. 8, the protruding portion 1817 is inserted into the through-hole 1851 so that the first heater 185 is mounted on the bottom portion 1815. Similarly, as illustrated in FIG. 8, the protruding portion 1818 is inserted into a through-hole 1861 so that the second heater 186 is mounted on the bottom portion 1816. The protruding portion 1817 is fitted into the recessed portion RE1 included in the first positioning portion PS1 and the protruding portion 1818 is fitted into the recessed portion RE2 included in the second positioning portion PS2, whereby the liquid ejecting head 20 is positioned with respect to the carriage 18.

The surfaces of some of the columnar portions 1812 in the −Z direction include recessed portions protruding in the +Z direction. Screws 193 are in one-to-one correspondence with the through-holes 227 included in the case 22. The respective screws 193 are inserted into the corresponding through-holes 227 and are engaged with the recessed portions included in any of the columnar portions 1812. Thus, the liquid ejecting head 20 is fixed to the spacer 181 of the carriage 18 at the position where the liquid ejecting head 20 is positioned by the spacer 181 of the carriage 18.

1.2.2. Positioning of Circuit Substrate 26 with Respect to Holder Cover 23

As illustrated in FIG. 5, the first flange portion U1 includes a third positioning portion PS3 for positioning the circuit substrate 26 with respect to the holder cover 23. The second flange portion U2 includes a fourth positioning portion PS4 for positioning the circuit substrate 26 with respect to the holder cover 23. Specifically, the third positioning portion PS3 and the fourth positioning portion PS4 are substantially columnar members protruding in the −Z direction.

As illustrated in FIG. 5, the third positioning portion PS3 passes through the through-hole 267 and the fourth positioning portion PS4 passes through the through-hole 268 so that the circuit substrate 26 is positioned with respect to the holder cover 23. The circuit substrate 26 is provided with the gap dl interposed between the circuit substrate 26 and the holder cover 23 in the Z-axis direction. The circuit substrate 26 is in contact with the third positioning portion PS3 and the fourth positioning portion PS4 in the X-axis direction and the Y-axis direction perpendicular to the Z-axis direction. Portions where the holder cover 23 is in contact with the circuit substrate 26 are only the third positioning portion PS3 and the fourth positioning portion PS4. As the holder cover 23 is formed of metal, no wires are provided on the inner peripheral surfaces of the through-hole 267 and the through-hole 268 of the circuit substrate 26.

1.3. Heat-Transfer Path of First Heater 185

A heat-transfer path of the first heater 185 will be described with reference to FIGS. 5 and 11.

Figure 11:
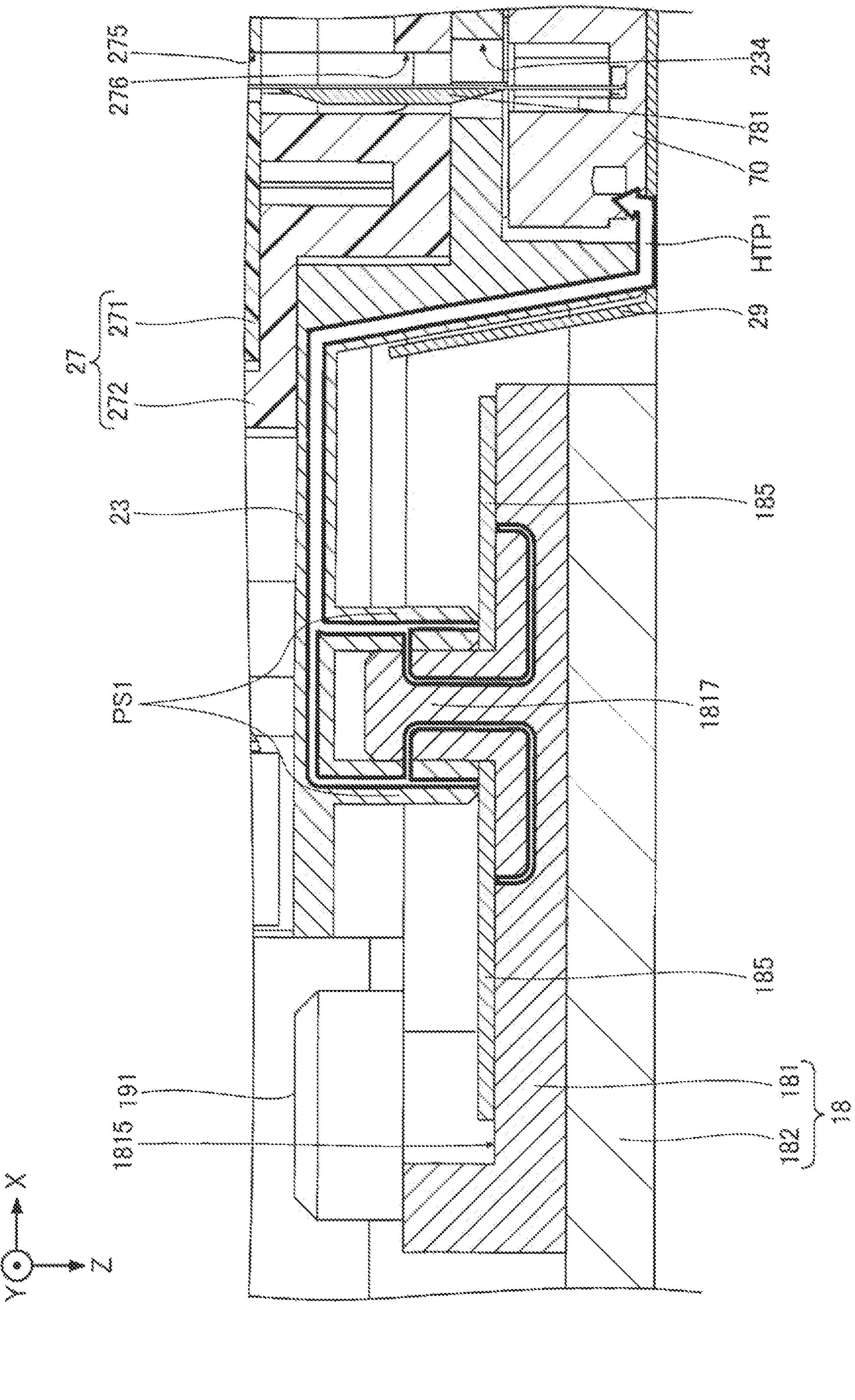
FIG. 11 is an XI-XI sectional view illustrating a state where the liquid ejecting head illustrated in FIG. 7 is attached to the carriage.

FIG. 11 is an XI-XI sectional view illustrating a state where the liquid ejecting head 20 illustrated in FIG. 8 is attached to the carriage 18. The XI-XI section is a section parallel to the XZ plane. In order to avoid complication of the drawing, the sectional view in FIG. 11 illustrates only the vicinity of the first positioning portion PS1. In order to avoid complication of the drawing, the inside of the head chip 70 is not illustrated in the sectional view in FIG. 11.

FIG. 11 illustrates a heat-transfer path HTP1 from the first heater 185 to the ink of the liquid ejecting head 20. As the inside of the head chip 70 is not illustrated in FIG. 11, a heat-transfer path in the head chip 70 included in the heat-transfer path HTP1 is also not illustrated. FIG. 4 illustrates the heat-transfer path in the head chip 70.

First, the heat-transfer path from the first heater 185 to the head chip 70 will be described with reference to FIG. 11. The first heater 185 is mounted on the bottom portion 1815 of the spacer 181. Further, as illustrated in FIG. 11, the end of the first positioning portion PS1 in the +Z direction is in contact with the surface of the first heater 185 in the −Z direction. The heat generated by the first heater 185 is transferred to the holder cover 23 via the protruding portion 1817 of the spacer 181 and the end of the first positioning portion PS1 in the +Z direction. The holder cover 23 is formed of metal having a relatively high thermal conductivity and heat is thus easily transmitted thereto. The holder cover 23 is in contact with the second holder 272 formed of resin and the fixing plate 29 formed of metal. As the metal has higher thermal conductivity than that of the resin, the heat in the holder cover 23 is transferred to the fixing plate 29. The heat transferred to the fixing plate 29 is then transferred to the head chip 70.

Although the end of the first positioning portion PS1 in the +Z direction is in contact with the surface of the first heater 185 in the −Z direction according to the present embodiment, the end of the first positioning portion PS1 in the +Z direction is not necessarily in contact with the surface of the first heater 185 in the −Z direction. Even when the end of the first positioning portion PS1 in the +Z direction is not in contact with the surface of the first heater 185 in the −Z direction, the heat generated by the first heater 185 is transferred to the holder cover 23 via the protruding portion 1817.

Next, the heat-transfer path in the head chip 70 will be described with reference to FIG. 4. The compliance portion 75 is in contact with the fixing plate 29. The heat transferred to the fixing plate 29 is then transferred to the flow path formation substrate 71 via the compliance portion 75. As the support body 754 included in the compliance portion 75 is formed of metal having a high thermal conductivity, the heat of the support body 754 is transferred to the sealing plate 752. Although the sealing plate 752 is formed of a resin having a low thermal conductivity, the sealing plate 752 is thinner than the flow path formation substrate 71 and therefore the heat transferred to the sealing plate 752 is then transferred to the flow path formation substrate 71. The heat transferred to the flow path formation substrate 71 is then transferred to the ink in the opening 712, the supply flow path 714, and the communication flow path 716. As described above, the ink inside each of the plurality of head chips 70 is heated by the first heater 185.

As illustrated in FIG. 11, the drive circuit 781 is partially located in the opening 276 of the second holder 272. The drive circuit 781 being partially located in the opening 276 means that the drive circuit 781 and the opening 276 are partially overlapped with each other when viewed in a direction perpendicular to the extending direction of the opening 276, in other words, a direction parallel to the XY plane.

Although not illustrated, the second heater 186 also heats the ink inside each of the plurality of head chips 70 via the holder cover 23 and the fixing plate 29.

1.4. Summary of First Embodiment

As described above, the liquid ejecting apparatus 10 according to the first embodiment includes the liquid ejecting head 20, the carriage 18, the first heater 185, and the second heater 186. The liquid ejecting head 20 includes the plurality of head chips 70, the holder 27, the holder cover 23, and the fixing plate 29. Each of the plurality of head chips 70 includes the nozzle plate 74 including the nozzles N for ejecting the ink. The holder 27 is formed of resin, holds the plurality of head chips 70, and includes the flow path for supplying the ink to each of the plurality of head chips 70. The holder cover 23 is formed of a material having a higher thermal conductivity than that of the holder 27 and houses the plurality of head chips 70 and the holder 27. The fixing plate 29 is formed of metal and has the holder cover 23 and the plurality of head chips 70 fixed thereto. The liquid ejecting head 20 is mounted on the carriage 18. The first heater 185 and the second heater 186 are mounted on the carriage 18 and heat the ink inside each of the plurality of head chips 70 via the holder cover 23 and the fixing plate 29.

When using an ink that needs to be used in a high-temperature state, such as UV ink, it is desirable to heat the ink near the head chip, more preferably the ink near the nozzle N, in order to improve ejection performance. However, in a liquid ejecting head in which a plurality of head chips is held only by a holder formed of a resin having a low thermal conductivity, it is difficult to heat the liquid inside each of the plurality of head chips from outside the liquid ejecting head. There is a possible aspect in which the holder is formed of metal or ceramic having a higher thermal conductivity than that of resin and the ink in the head chip is thus heated by a heater provided outside the liquid ejecting head. However, a complicated shape of a flow path formed in the holder makes it difficult to accurately form the flow path in the holder using metal or ceramic in this aspect, and the manufacturing cost of the liquid ejecting head increases.

Therefore, the liquid ejecting head 20 according to the embodiment includes the holder cover 23 formed of a material having a higher thermal conductivity than that of resin. Thus, the first heater 185 and the second heater 186 may heat the ink in the head chip 70 via the holder cover 23. As the holder 27 including the flow path is formed of resin, it is possible to suppress an increase in the manufacturing cost of the liquid ejecting head 20. Furthermore, the liquid ejecting head 20 according to the present embodiment facilitates the wiring of the first heater 185 and the second heater 186 as compared with a configuration in which the first heater 185 and the second heater 186 are provided in the liquid ejecting head 20. The reason why the wiring is facilitated is that, in the configuration in which the first heater 185 and the second heater 186 are provided in the liquid ejecting head 20, it is necessary to consider the wiring of the first heater 185 and the second heater 186 in the liquid ejecting head 20 and a bonding portion between the above wiring and the wiring outside the liquid ejecting head 20. Furthermore, in the liquid ejecting apparatus 10 according to the present embodiment, there is no bonding portion between the wiring of the first heater 185 and the second heater 186 in the liquid ejecting head 20 and the wiring outside the liquid ejecting head 20, and therefore it is easy to replace the liquid ejecting head 20, as compared with the configuration in which the first heater 185 and the second heater 186 are provided in the liquid ejecting head 20.

The holder cover 23 includes the holding portion UC that holds the holder 27, the first flange portion U1 provided to extend from the holding portion UC in the −X direction in which the plurality of head chips 70 is arranged, and the second flange portion U2 provided to extend from the holding portion UC in the +X direction. The first flange portion U1 includes the first positioning portion PS1 for positioning the liquid ejecting head 20 with respect to the carriage 18. The second flange portion U2 includes the second positioning portion PS2 for positioning the liquid ejecting head 20 with respect to the carriage 18. The first heater 185 heats the holder cover 23 via the first positioning portion PS1. The second heater 186 heats the holder cover 23 via the second positioning portion PS2.

The accurate positioning of the liquid ejecting head 20 with respect to the carriage 18 is needed to improve the printing quality. According to the present embodiment, the heat-transfer path HTP1 includes the first positioning portion PS1 that needs to be in contact with the carriage 18 for the positioning. In an aspect where the first positioning portion PS1 is not included in the heat-transfer path from the first heater 185 to the ink in the liquid ejecting head 20, a metal component needs to be prepared to fill a space between the carriage 18 and the holder cover 23. Therefore, according to the present embodiment, as compared with the aspect where the first positioning portion PS1 is not included in the heat-transfer path from the first heater 185 to the ink in the head chip 70, the number of components of the liquid ejecting apparatus 10 may be reduced, and therefore the manufacturing of the liquid ejecting apparatus 10 is facilitated.

The carriage 18 includes the spacer 181 that is formed of metal and is brought into contact with the first positioning portion PS1 and the second positioning portion PS2 to be positioned with respect to the liquid ejecting head 20 and includes the carriage main body portion 182 that is formed of metal and holds the spacer 181. The first heater 185 and the second heater 186 heat the spacer 181 and heat the first positioning portion PS1 and the second positioning portion PS2 via the spacer 181.

As illustrated in FIG. 8 and the like, the carriage main body portion 182 is, to hold the spacer 181, large and has a large surface area as compared with the spacer 181. As the surface area is larger, heat radiation is more likely to occur. Therefore, according to the present embodiment, compared to an aspect in which the ink inside the head chip 70 is heated via the carriage main body portion 182, heat release due to heat radiation may be suppressed and thus a decrease in the heating efficiency for the ink may be reduced. The heating efficiency for the ink is the ratio of the amount of heat to heat the ink in the head chip 70 to the amount of heat generated by the first heater 185 and the second heater 186.

The liquid ejecting head 20 includes the case 22 that is formed of resin, is stacked on the side opposite from the fixing plate 29 with respect to the holder cover 23, and includes the flow path 225 for supplying the liquid to the holder 27. The case 22 is an example of "flow path member".

The case 22 serving as a flow path member formed of a resin having a lower thermal conductivity than that of metal may suppress the release of heat transferred to the holder cover 23 in the −Z direction.

The liquid ejecting head 20 includes the circuit substrate 26 that is stacked on the holder 27 with a gap interposed between the circuit substrate 26 and the holder cover 23 in the Z-axis direction. The holder cover 23 is made of metal. The first flange portion U1 includes the third positioning portion PS3 for positioning the circuit substrate 26 with respect to the holder cover 23. The second flange portion U2 includes the fourth positioning portion PS4 for positioning the circuit substrate 26 with respect to the holder cover 23.

The positioning accuracy is improved when the third positioning portion PS3 and the fourth positioning portion PS4 are both located at positions away from the center of the circuit substrate 26 in plan view, compared to when the third positioning portion PS3 and the fourth positioning portion PS4 are located near the center of the circuit substrate 26 in plan view. Therefore, with regard to the first flange portion U1 and the second flange portion U2 separated from each other in the X-axis direction, as the first flange portion U1 includes the third positioning portion PS3 and the second flange portion U2 includes the fourth positioning portion PS4, the circuit substrate 26 may be accurately arranged as compared to an aspect where the holding portion UC includes the third positioning portion PS3 and the fourth positioning portion PS4. According to the present embodiment, although the holder cover 23 is formed of metal in order to heat the ink inside each of the plurality of head chips 70 from outside the liquid ejecting head 20, it is possible to ensure insulation between the holder cover 23 and the circuit substrate 26, because the circuit substrate 26 is in contact with the holder cover 23 formed of metal, which is also a conductive material, at only the third positioning portion PS3 and the fourth positioning portion PS4.

The liquid ejecting apparatus 10 includes the wiring member 78 that includes the drive circuit 781 and is coupled to the circuit substrate 26 and any one of the plurality of head chips 70. The first holder 271 includes the opening 275 through which the wiring member 78 is inserted. Similarly, the second holder 272 includes the opening 276 through which the wiring member 78 is inserted. The drive circuit 781 is partially located in the opening 276.

As the drive circuit 781 is partially located in the opening 276 of the second holder 272 formed of resin, it is possible to suppress an abnormal operation of the drive circuit 781 due to the holder cover 23 heated to a high temperature by the first heater 185 and the second heater 186. As the resin has an insulating property, short-circuiting of the wiring of the drive circuit 781 may be inhibited even when the drive circuit 781 is brought into contact with the opening 276.

The holder cover 23 is provided between the holder 27 and the head chip 70 and includes the beam portion 236 extending in the Y-axis direction.

As the beam portion 236 is heated, the plurality of head chips 70 provided in the space S3 may be heated via the air in the space S3.

2. Modification

Each embodiment described above may be modified in various ways. Specific modification aspects will be described as examples below. Two or more aspects optionally selected from the following examples may be combined as appropriate as long as there is no contradiction from each other.

2.1. First Modification

According to the first embodiment, although the carriage 18 includes the spacer 181 and the carriage main body portion 182, the carriage 18 may have an integrated combination of the spacer 181 and the carriage main body portion 182. According to a first modification, the carriage 18 is made of metal. The first heater 185 and the second heater 186 heat the ink inside each of the plurality of head chips 70 via the carriage 18 according to the first modification, the first positioning portion PS1, and the second positioning portion PS2.

2.2. Second Modification

According to the first embodiment and the first modification, the case 22 includes the through-hole 227 used for the screw 193 for fixing the liquid ejecting head 20 to the carriage 18, but this is not a limitation. For example, the holder cover 23 may include a through-hole used for a screw for fixing the liquid ejecting head 20 to the carriage 18. For example, the first flange portion U1 and the second flange portion U2 according to a second modification include the through-hole described above.

According to the second modification, the first heater 185 and the second heater 186 may heat the ink in the head chip 70 via the screw that needs to be in contact with the carriage 18 in order to fix the liquid ejecting head 20 to the carriage 18, and it is possible to improve the heating efficiency for the ink as compared with the first embodiment.

2.3. Third Modification

According to the first embodiment and the second modification, the carriage 18 may include a heat insulating material.

Figure 12:
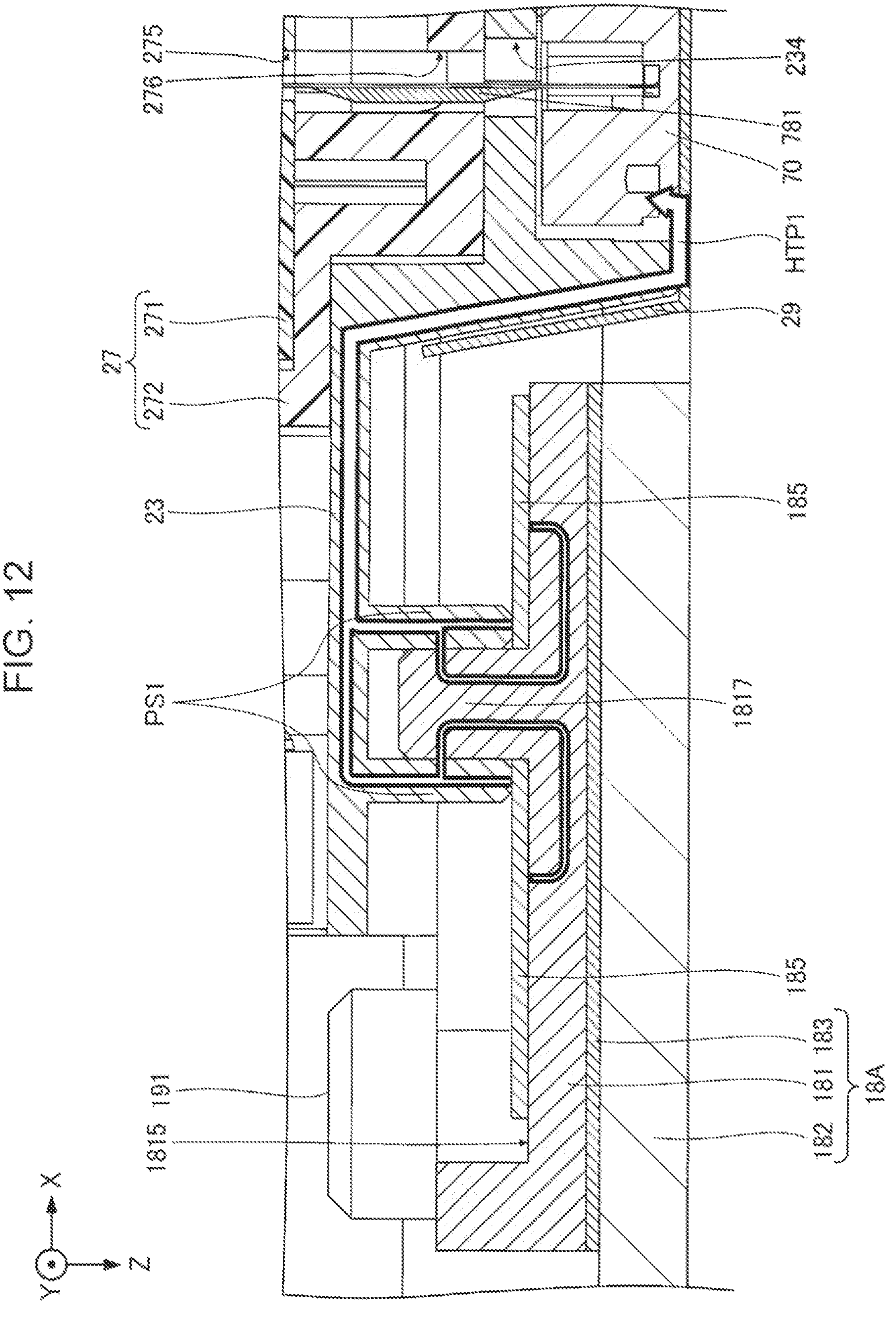
FIG. 12 is a sectional view of a carriage according to a third modification.

FIG. 12 is a sectional view of a carriage 18A according to a third modification. More specifically, the sectional view illustrated in FIG. 12 is an XII-XII sectional view of the state where the liquid ejecting head 20 illustrated in FIG. 8 is attached to the carriage 18A according to the third modification.

As illustrated in FIG. 12, the carriage 18A includes the spacer 181, the carriage main body portion 182, and a heat insulating material 183. The heat insulating material 183 is provided between the spacer 181 and the carriage main body portion 182 and has a lower thermal conductivity than that of the holder cover 23. Examples of the material having a lower thermal conductivity than that of the holder cover 23 include a resin or ceramic having a thermal conductivity lower than that of metal forming the holder cover 23. The heat insulating material 183 preferably has a lower thermal conductivity than that of the holder 27.

As described above, according to the third modification, the heat generated by the first heater 185 and the second heater 186 may be inhibited from being transferred to the carriage main body portion 182 and being released.

2.4. Fourth Modification

According to the first embodiment, the second modification, and the third modification, the first positioning portion PS1 and the second positioning portion PS2 include the recessed portions RE and the spacer 181 includes the protruding portion 1817 and the protruding portion 1818, but this is not a limitation. For example, the spacer 181 may include a recessed portion that is recessed in the +Z direction, and the first positioning portion PS1 and the second positioning portion PS2 may include a protruding portion that protrudes in the −Z direction. The recessed portions of the spacer 181 are fitted into the protruding portions included in the first positioning portion PS1 and the second positioning portion PS2 so that the liquid ejecting head 20 is positioned with respect to the carriage 18.

2.5. Fifth Modification

According to each of the aspects described above, the plurality of head chips 70 is arranged in a line in the X-axis direction, but may be arranged in a staggered manner in the X-axis direction. For example, the head chip 70 located farthest in the −X direction and the head chip 70 located third from the −X direction may be arranged along a first straight line parallel to the X-axis direction, and the head chip 70 located second from the −X direction and the head chip 70 located farthest in the +Z direction may be arranged along a second straight line parallel to the first straight line.

2.6. Sixth Modification

According to each of the aspects described above, the drive circuit 781 is partially located in the opening 276 of the second holder 272, but the entire drive circuit 781 may be located in the opening 276 of the second holder 272. Alternatively, the drive circuit 781 may be partially located in the opening 275 of the first holder 271, and the remaining part of the drive circuit 781 may be located in the opening 276 of the second holder 272.

2.7. Seventh Modification

According to each of the aspects described above, each of the plurality of head chips 70 extends in the Y-axis direction, but may extend not only in a direction perpendicular to the X-axis direction, such as the Y-axis direction, but also a direction intersecting with the X-axis direction. When each of the plurality of head chips 70 extends in a specific direction intersecting with the X-axis direction, the beam portion 236 included in the holder cover 23 also extends in the specific direction described above.

2.8. Eighth Modification

According to each of the aspects described above, the first heater 185 is mounted on the bottom portion 1815 and the second heater 186 is mounted on the bottom portion 1816, but this is not a limitation. For example, the first heater 185 may be attached to a side surface of the holding portion UC of the holder cover 23 in the −X direction, may be attached to a surface of the fixing plate 29 in the −X direction, or may be attached to a side surface of the holding portion UC of the holder cover 23 in the +Y direction. Similarly, the second heater 186 may be attached to a side surface of the holding portion UC in the +X direction, or may be attached to a side surface of the holding portion UC of the holder cover 23 in the −Y direction. The first heater 185 may be provided at a portion of the carriage 18 located in the +Y direction with respect to a side surface of the holding portion UC of the holder cover 23 in the +Y direction so as to heat the side surface. Similarly, the second heater 186 may be provided at a portion of the carriage 18 located in the −Y direction with respect to a side surface of the holding portion UC of the holder cover 23 in the −Y direction so as to heat the side surface.

2.9. Ninth Modification

In the serial head described according to each of the aspects above, the carriage 18 having the liquid ejecting head 20 mounted thereon is repeatedly reciprocated in the X direction, but the present disclosure may also be applied to a line head in which the liquid ejecting head 20 is arranged over the entire width of the medium 11.

2.10. Tenth Modification

In the piezoelectric liquid ejecting head 20 described according to the embodiment above, the piezoelectric element 732 that applies a mechanical vibration to the pressure chamber C is used, but it is possible to use a thermal liquid ejecting head that uses a heat generating element that generates air bubbles inside the pressure chamber C due to the heat.

2.11. Eleventh Modification

In the configuration described according to the above-described embodiment, the ink is supplied to the flow path 225 of the case 22 from the liquid storage section 17 mounted on the carriage 18, but a configuration may be such that the ink is supplied from a liquid storage section provided outside the carriage 18 via a tube.

2.12. Twelfth Modification

The opening shape of one of the through-hole 267 and the through-hole 268 may be an oval shape that is elongated in the X-axis direction, which is a direction in which the through-hole 267 and the through-hole 268 are arranged. Even when the positions of the third positioning portion PS3 and the fourth positioning portion PS4 are shifted in the X-axis direction due to a manufacturing error, it is possible to inhibit the third positioning portion PS3 and the fourth positioning portion PS4 from being unable to be inserted into the through-hole 267 and the through-hole 268.

2.13. Other Modifications

The liquid ejecting apparatus 10 described in the above embodiment may be used for various apparatuses such as facsimile apparatuses and copiers in addition to apparatuses dedicated for printing. However, the application of the liquid ejecting apparatus 10 according to the present disclosure is not limited to printing. For example, a liquid ejecting apparatus that ejects a solution of a coloring material is used as a manufacturing apparatus that forms a color filter of a liquid crystal display device, an organic EL display, and the like. EL is an abbreviation for electro luminescence. FED is an abbreviation for field emission display. A liquid ejecting apparatus that ejects a solution of a conductive material is used as a manufacturing apparatus that forms wiring or electrodes of a wiring substrate.

3. Note

From the aspects described above, for example, the following configurations are comprehended.

According to a first aspect that is a suitable aspect, a liquid ejecting apparatus includes a liquid ejecting head including a plurality of head chips each including a nozzle plate including a nozzle ejecting a liquid, a holder that is formed of resin, holds the plurality of head chips, and includes a flow path for supplying the liquid to each of the plurality of head chips, a holder cover that is formed of a material having a higher thermal conductivity than a thermal conductivity of the holder and houses the plurality of head chips and the holder, and a fixing plate that is formed of metal and to which the holder cover and the plurality of head chips are fixed; a carriage on which the liquid ejecting head is mounted; and a heater that is mounted on the carriage and heats the liquid inside each of the plurality of head chips via the holder cover and the fixing plate.

The liquid ejecting head according to the first aspect includes the holder cover formed of a material having a higher thermal conductivity than that of resin. Therefore, the heater may heat ink in the head chips via the holder cover. As the holder including the flow path is formed of resin, it is possible to suppress an increase in the manufacturing cost of the liquid ejecting head.

According to a second aspect that is a specific example of the first aspect, the holder cover includes a holding portion holding the holder, a first flange portion provided to extend from the holding portion in a first direction in which the plurality of head chips is arranged, and a second flange portion provided to extend from the holding portion in a direction opposite from the first direction, the first flange portion includes a first positioning portion for positioning the liquid ejecting head with respect to the carriage, the second flange portion includes a second positioning portion for positioning the liquid ejecting head with respect to the carriage, and the heater heats the holder cover via the first positioning portion and the second positioning portion.

According to the second aspect, as compared to an aspect in which a heat-transfer path from the heater to the ink does not include the first positioning portion and the second positioning portion, it is possible to reduce the number of components of the liquid ejecting apparatus, and thus it is easy to manufacture the liquid ejecting apparatus.

According to a third aspect that is a specific example of the second aspect, the holder cover includes a hole through which a screw for fixing the liquid ejecting head to the carriage is inserted.

The heater may heat the liquid in the head chips via the screw that needs to be in contact with the carriage in order to fix the liquid ejecting head to the carriage, and it is possible to improve the heating efficiency for the liquid as compared to the first aspect.

According to a fourth aspect that is a specific example of the second or third aspect, the carriage includes a spacer that is formed of metal and is brought into contact with the first positioning portion and the second positioning portion to be positioned with respect to the liquid ejecting head and a carriage main body portion that is formed of metal and holds the spacer, and the heater heats the spacer and heats the first positioning portion and the second positioning portion via the spacer.

According to the fourth aspect, as compared to an aspect in which the liquid in the head chips is heated via the carriage main body portion, it is possible to suppress heat release due to heat radiation, and thus it is possible to reduce a decrease in the heating efficiency for the liquid.

According to a fifth aspect that is a specific example of the fourth aspect, the carriage further includes a heat insulating material that is provided between the spacer and the carriage main body portion and has a lower thermal conductivity than a thermal conductivity of the holder cover.

According to the fifth aspect, it is possible to suppress transfer of the heat generated by the heater to the carriage main body portion.

According to a sixth aspect that is a specific example of any one of the first to fifth aspects, the liquid ejecting head includes a flow path member that is formed of resin, is stacked on a side opposite from the fixing plate with respect to the holder cover, and includes a flow path for supplying the liquid to the holder.

According to the sixth aspect, since the liquid ejecting head includes the flow path member formed of a resin having a lower thermal conductivity than that of metal, the heat transferred to the holder cover may be inhibited from being released to the side opposite from the fixing plate with respect to the holder cover.

According to a seventh aspect that is a specific example of any one of the first to sixth aspects, the liquid ejecting head includes a circuit substrate that is stacked on the holder with a gap between the circuit substrate and the holder cover in a stacking direction, the holder cover includes a holding portion holding the holder, a first flange portion provided to be positioned, from the holding portion, in a first direction in which the plurality of head chips is arranged, and a second flange portion provided to be positioned in a direction opposite from the first direction, the holder cover is formed of metal, the first flange portion includes a third positioning portion for positioning the circuit substrate with respect to the holder cover, and the second flange portion includes a fourth positioning portion for positioning the circuit substrate with respect to the holder cover.

According to the seventh aspect, although the holder cover is formed of metal in order to heat the ink inside the head chips from outside the liquid ejecting head, it is possible to ensure insulation between the holder cover and the circuit substrate as the circuit substrate is in contact with the holder cover formed of metal, which is also a conductive material, only at the third positioning portion and the fourth positioning portion.

According to an eighth aspect that is a specific example of the seventh aspect, a wiring member is included, which includes a drive circuit and is coupled to the circuit substrate and one of the plurality of head chips, in which the holder includes an opening through which the wiring member is inserted, and the drive circuit is partially or entirely located in the opening.

According to the eighth aspect, as the drive circuit is partially or entirely located in the opening of the holder formed of resin, it is possible to inhibit an abnormal operation of the drive circuit due to the holder cover heated to a high temperature by the heater. As the resin has an insulating property, short-circuiting of the wiring of the drive circuit may be inhibited even when the drive circuit is brought into contact with the opening of the holder.

According to a ninth aspect that is a specific example of the first to eighth aspects, the holder cover includes a beam portion that is provided between the holder and the head chips and extends in a second direction intersecting a first direction in which the plurality of head chips is arranged.

According to the ninth aspect, as the beam portion is heated, the plurality of head chips provided in the space may be heated via the air in the space having the beam portion as part of the wall surface.

According to a tenth aspect that is a suitable aspect, a liquid ejecting head is mounted on a carriage on which a heater is mounted, and the liquid ejecting head includes a plurality of head chips each including a nozzle plate including a nozzle ejecting a liquid, a holder that is formed of resin, holds the plurality of head chips, and includes a flow path for supplying the liquid to each of the plurality of head chips, a holder cover that is formed of a material having a higher thermal conductivity than a thermal conductivity of the holder and houses the plurality of head chips and the holder, and a fixing plate that is formed of metal and to which the holder cover and the plurality of head chips are fixed. The heater heats the liquid inside each of the plurality of head chips via the holder cover and the fixing plate.

The liquid ejecting head according to the tenth aspect includes the holder cover formed of a material having a higher thermal conductivity than that of resin. Therefore, the heater may heat ink in the head chips via the holder cover. As the holder including the flow path is formed of resin, it is possible to suppress an increase in the manufacturing cost of the liquid ejecting head.

What is claimed is:

1. A liquid ejecting apparatus comprising:
- a liquid ejecting head including:
  - head chips each including a nozzle plate including nozzles configured to eject a liquid;
  - a holder that is formed of resin, the holder holding the head chips and including a flow path for supplying the liquid to each of the head chips;
  - a holder cover that is formed of a material having a higher thermal conductivity than a thermal conductivity of the holder and houses the head chips and the holder; and
  - a fixing plate that is formed of metal and to which the holder cover and the head chips are fixed, the fixing plate including openings respectively exposing each of the nozzle plates;
- a carriage on which the liquid ejecting head is mounted; and
- a heater that is mounted on the carriage and heats the liquid inside each of the head chips via the holder cover and the fixing plate.

2. The liquid ejecting apparatus according to claim 1, wherein
- the holder cover includes
  - a holding portion holding the holder,
  - a first flange portion provided to extend from the holding portion in a first direction in which the head chips is arranged, and
  - a second flange portion provided to extend from the holding portion in a direction opposite from the first direction,
- the first flange portion includes a first positioning portion for positioning the liquid ejecting head with respect to the carriage,
- the second flange portion includes a second positioning portion for positioning the liquid ejecting head with respect to the carriage, and
- the heater heats the holder cover via the first positioning portion and the second positioning portion.

3. The liquid ejecting apparatus according to claim 2, wherein
- the holder cover includes a hole through which a screw for fixing the liquid ejecting head to the carriage is inserted.

4. The liquid ejecting apparatus according to claim 2, wherein
- the carriage includes
  - a spacer that is formed of metal and is brought into contact with the first positioning portion and the second positioning portion to be positioned with respect to the liquid ejecting head, and
  - a carriage main body portion that is formed of metal and holds the spacer, and
- the heater heats the spacer and heats, via the spacer, the first positioning portion and the second positioning portion.

5. The liquid ejecting apparatus according to claim 3, wherein
- the carriage includes
  - a spacer that is formed of metal and is brought into contact with the first positioning portion and the second positioning portion to be positioned with respect to the liquid ejecting head, and
  - a carriage main body portion that is formed of metal and holds the spacer, and
- the heater heats the spacer and heats, via the spacer, the first positioning portion and the second positioning portion.

6. The liquid ejecting apparatus according to claim 4, wherein
- the carriage further includes a heat insulating material that is provided between the spacer and the carriage main body portion and has a lower thermal conductivity than a thermal conductivity of the holder cover.

7. The liquid ejecting apparatus according to claim 5, wherein
- the carriage further includes a heat insulating material that is provided between the spacer and the carriage main body portion and has a lower thermal conductivity than a thermal conductivity of the holder cover.

8. The liquid ejecting apparatus according to claim 1, wherein the liquid ejecting head includes a flow path member that is formed of resin, is stacked on a side opposite from the fixing plate with respect to the holder cover, and includes a flow path for supplying the liquid to the holder.

9. The liquid ejecting apparatus according to claim 1, wherein the liquid ejecting head includes a circuit substrate that is stacked on the holder with a gap between the circuit substrate and the holder cover in a stacking direction, the holder cover includes a holding portion holding the holder, a first flange portion provided to be positioned, from the holding portion, in a first direction in which the head chips is arranged, and a second flange portion provided to be positioned in a direction opposite from the first direction, the holder cover is formed of metal, the first flange portion includes a third positioning portion for positioning the circuit substrate with respect to the holder cover, and the second flange portion includes a fourth positioning portion for positioning the circuit substrate with respect to the holder cover.

10. The liquid ejecting apparatus according to claim 9, further comprising a wiring member that includes a drive circuit and is coupled to the circuit substrate and one of the head chips, wherein the holder includes an opening through which the wiring member is inserted, and the drive circuit is partially or entirely located in the opening.

11. The liquid ejecting apparatus according to claim 1, wherein the holder cover includes a beam portion that is provided between the holder and the head chips and extends in a second direction intersecting a first direction in which the plurality of head chips is arranged.

12. A liquid ejecting head mounted on a carriage on which a heater is mounted, the liquid ejecting head comprising:

head chips each including a nozzle plate including a nozzle configured to eject a liquid;

a holder that is formed of resin, the holder holding the head chips and including flow path for supplying the liquid to each of the head chips;

a holder cover that is formed of a material having a higher thermal conductivity than a thermal conductivity of the holder and houses the head chips and the holder; and a fixing plate that is formed of metal and to which the holder cover and the head chips are fixed, the fixing plate including openings respectively exposing each of the nozzle plates, wherein the heater heats the liquid inside each of the head chips via the holder cover and the fixing plate.

13. The liquid ejecting apparatus according to claim 1, wherein the holder cover includes:

a first positioning portion for positioning the liquid ejecting head with respect to the carriage; and a second positioning portion for positioning the liquid ejecting head with respect to the carriage, and the heater heats the holder cover via the first positioning portion and the second positioning portion.

14. The liquid ejecting head according to claim 12, wherein the holder cover includes:

a first positioning portion for positioning the liquid ejecting head with respect to the carriage; and a second positioning portion for positioning the liquid ejecting head with respect to the carriage, and the heater heats the holder cover via the first positioning portion and the second positioning portion.

* * * * *